United States Patent [19]

Pfatischer

[11] 4,065,830

[45] Jan. 3, 1978

[54] LARDING UTENSIL

[76] Inventor: Ludwig Pfatischer, Ludwig-Thoma-Strasse 63, 8183 Rottach-Egern, Germany

[21] Appl. No.: 687,983

[22] Filed: May 19, 1976

[51] Int. Cl.$^2$ .................. A22C 5/00; A22C 17/00; A23B 4/02
[52] U.S. Cl. .................................. 17/42.1; 99/494
[58] Field of Search ................... 99/494, 532–533, 99/345, 352; 17/42.1; 426/534, 641

[56] References Cited

U.S. PATENT DOCUMENTS

| 1,060,440 | 4/1913 | Ehrlich | 17/42.1 |
| 2,124,700 | 7/1938 | Hartzell | 17/42.1 |

Primary Examiner—Leonard D. Christian
Assistant Examiner—Robert Pous

[57] ABSTRACT

In a larding needle comprising a hollow shank for receiving a strip of bacon and for piercing the meat, a longitudinally displaceable pusher arm within the shank rides up a ramp at the front of the needle to eject a leading end of the strip of bacon.

9 Claims, 3 Drawing Figures

LARDING UTENSIL

The invention relates to a larding instrument, also variously known as a larding pin or larding needle, being an instrument for interlacing meat with strips of flavour-imparting substances such as bacon or fat.

An instrument of the kind referred to is known, for example, from DT-PS 254 640 and usually comprises a needle shank of U-shaped cross-section, which is pointed at the front and provided with a handle at the back, the interior of the shank containing a two-armed lever which is pivoted in such a way that, after inserting in the shank a strip of the material with which the meat is to be larded, preferably a strip of bacon, and after thrusting the needle shank into the meat, actuation of the rear arm of the lever causes the material to be pushed from the cavity and, on withdrawal of the needle shank, to remain in the hole pierced thereby.

Owing to a misconception in the basic design, such larding instruments have not proved successful in practice and have made little impact on the market.

It is an object of the present invention to provide an improved larding instrument which will be useful in practice.

According to the invention, an intermediate linkage is provided between the rear end of the front lever arm and the front end of the rear lever arm. This linkage first moves the front lever arm forwardly and lifts it at a ramp in the front portion of the cavity so as to be flush with the upper edge of the cavity, and then moves the rear portion of the front lever arm in wedge formation above the upper edge of the cavity of the shank.

In the aforementioned known larding instrument, the two-armed lever is so mounted that the front arm lifts the strip of bacon to a higher level at the leading end of the strip than at the trailing end, so that the leading end projects beyond the cavity of the hollow needle shank. On withdrawal of the needle pierced in the meat, this has the disadvantage that the strip of bacon will tend to be withdrawn again together with the shank illustrative of the prior art larding needles is the larding needle shown in U.S. Pat. No. 1,060,440 (Ehrlich, Apr. 29, 1913) wherein the arm for removing the bacon or similar material from the larding needle is hinged to the larding needle at a pivot. Implementation of the arm about the pivot elevates the leading edge of the arm relatively higher than the trailing edge. This disadvantage is avoided by means of the different manner of mounting the front lever arm in accordance with the invention. The mounting is such that the trailing end of the strip of bacon is now pressed against the meat and, since the front lever arm slips downwardly towards the meat, this lever arm can be withdrawn from the meat by itself whilst the trailing end of the strip of bacon is retained with in the hole that was pierced by the needle shank. The larding instrument according to the invention is so reliable in practice that, apart from lacing the meat with strips of bacon, it can also be used for strips of other flavour-imparting substances such as cucumber, mushroom and paprika.

In a modification of the invention, the needle shank is V-shaped cross-section. This has the advantage that the shank will more readily penetrate the meat because it is sharper. Provision may also be made for offsetting the handle in an upward direction relatively to the needle shank. This has the advantage that, in comparison with known larding instruments, there will be adequate space between the handle and the meat for accommodating the hand of the operator.

The intermediate linkage may be coupled to a plurality of needle shanks lying in a single plane. This makes the instrument suitable for catering establishments and hotels.

An example of the invention will now be described with reference to the accompanying diagrammatic drawings, wherein.

Figure 2:
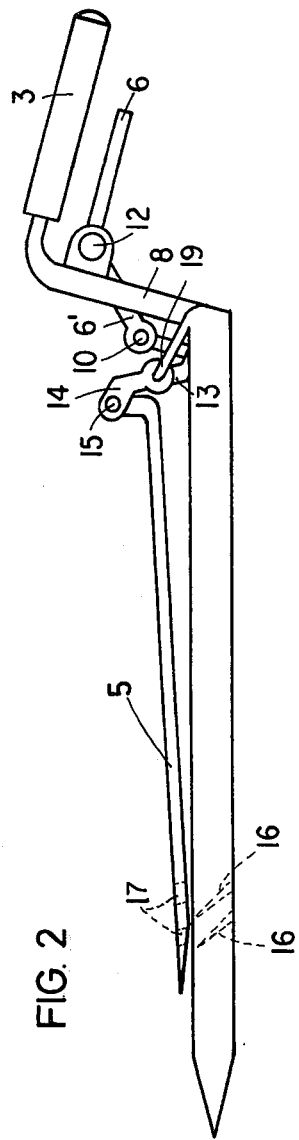
FIG. 2 is a similar view of the instrument in the operative position.
Figure 3:
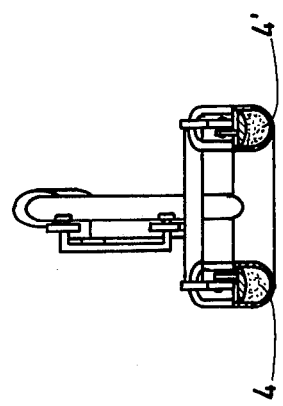
FIG. 3 is a cross-section of the instrument.

The larding instrument comprises a needle shank 1 which, as shown in FIG. 3, is of U-shaped cross-section. The tip 2 of the shank is pointed to facilitate piercing of the meat. The rear end of the instrument is provided with a handle 3. The interior of the shank 1 defines a cavity 4 or 4'. In the inoperative condition of the instrument, the front arm 5 of a two-armed lever is disposed on the base of the cavity 4 or 4', the rear arm being shown at 6. Between the two lever arm 5, 6 there is an intermediate linkage 7 which, when the rear lever arm 6 is pulled towards the handle 3, ensures that the front lever arm 5 is first of all moved forwardly. The intermediate linkage 7 is comprised of link 14 which mounts the front arm 5 on a pivot 15. Intermediate linkage 7 also includes an extension 13 which is fixedly secured to link 14 to facilitate rotation of the extension 13-link 14 assembly about a pivot 19, an arm 6' which essentially forms a bellcrank with rear arm 6 to pivot about pivot mount 12 and a rigid link 9 which connects bellcrank assembly 6-6' and extension 13-link 14 assembly at pivot mounts 10 and 11, respectively. The front portion of the cavity 4 or 4' of the needle shank contains a ramp (not visible in the drawing) which rises from the base of the shank 1 towards the tip 2, namely up to the closed surface of the shank 1 where the cavity terminates. This ensures that the intermediate linkage 7 lifts the front portion of the front lever arm 5 to be flush with the upper edge of the cavity 4 or 4' of the shank 1. When the larding instrument has been inserted in the meat, the front portion of the front lever arm 5 does not assume the position shown in FIG. 2 but the aforementioned position flush with the upper edge of the cavity of the shank 1. During further tightening of the rear lever arm 6 towards the handle 3, the rear portion of the front lever arm is then moved in wedge formation above the upper edge of the cavity 4 or 4' of the shank 1 to the position shown in FIG. 2.

Figure 1:
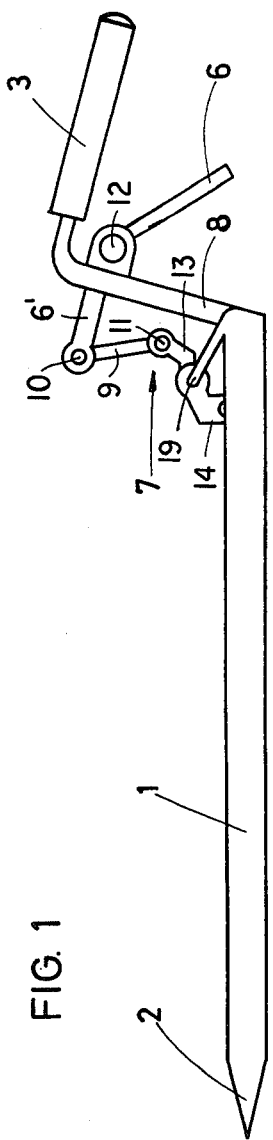
FIG. 1 is a side elevation of a larding instrument in an inoperative position.

As will be evident from FIGS. 1 and 2, the coupling between the handle 3 and the needle shank 1 is by way of an arm 8 which is mounted and bent rearwardly so that the handle 3 is upwardly offset relatively to the shank 1 to provide space for inserting a hand between the handle 3 and the meat to be larded.

With the larding instrument according to the invention, the rear end of the hole pierced in the meat by the shank is wider than at the front end. Upon withdrawing the instrument, the strip of bacon is therefore retained at the front end in so far that the hole closes to surround the strip of bacon. The front lever arm can then be readily withdrawn from the remainder of the hole since the rear end of the strip of bacon is clamped or wedged against the meat.

A modified and preferred embodiment provides for barbs 16 stamped out of the base of the shank 1 and bent upwardly to leave holes in the base. These barbs or hooks 16 afford a better hold on the strip of bacon on insertion of the instrument in the meat and will best perform their function if they are directed forwardly. The front lever arm 5 will then exhibit apertures 17 through which the barbs or hooks 16 pass.

Figure 4:
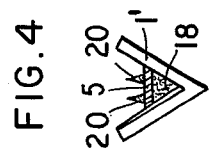

The front lever arm 5 may be solid or of V-shaped cross-section as seen in FIG. 4; or U-shaped cross-section as seen in FIG. 3. The ramp 18 in FIG. 4 extends from the rear of needle shank 1' to the tip, the elevation of the ramp 18 being higher at the leading edge of needle shank 1' than at the rear end. Barbs 20 are mounted directly on the front arm 5 as seen in FIG. 4, thereby providing an alternative to the barbs 16 which extend from the needle shank 1 through apertures 17 as seen in FIG. 2.

In the case of long larding instruments, it may be desirable to provide an additional lever which ensures that the front lever arm is first of all lifted to a horizontal position before the intermediate linkage starts to function.

I claim:

1. A larding needle comprising a needle shank which is pointed at the front and which has a longitudinal cavity extending the length thereof; a handle at the back; a ramp in the longitudinal cavity which ramp has the lowest elevation thereof at the rear of the cavity and the highest elevation thereof at the front of the cavity; a first front lever arm pivotally mounted in the longitudinal cavity of the shank a second rear lever arm pivotally mounted in proximity to the handle; intermediate linkage means for connecting the first front lever arm and the second rear lever arm and for initially moving the front lever arm forwardly and upwardly from the ramp in the front portion of the cavity so as to be flush with the upper edge of the cavity, and for subsequently moving the rear portion of the front lever arm to an elevation above the upper edge of the cavity in the shaft and the leading edge of the first front lever arm.

2. A larding instrument as in claim 1 further comprising a rigid arm which connects the needle shank and the handle and wherein the intermediate linkage is comprised of a first bellcrank pivotally mounted on the rigid arm connecting the needle shank and the handle, which bellcrank is comprised of the rear lever arm and an extension on the opposite side of the bellcrank pivot; a second bellcrank pivotally mounted to the needle shank which second bellcrank is comprised of a link which pivotally mounts the front lever arm and an extension on the side of the second bellcrank pivot opposite the link and a rigid link pivotally connecting the first and second bellcrank.

3. A larding instrument according to claim 2, wherein the handle is offset upwardly from the shank.

4. A larding instrument according to claim 2, wherein the handle is offset upwardly from the shank.

5. A larding instrument according to claim 2, further comprising barbs on the front lever arm.

6. A larding instrument according to claim 2 comprising a plurality of needle shanks connected to the intermediate linkage.

7. A larding instrument according to claim 2 further comprising barbs on the base of the shank and apertures in the front of the front lever arm through which the barbs can pass.

8. A larding instrument as in claim 1 wherein the needle shank is U-shaped in cross section.

9. An instrument for lacing meat with a strip of material, comprising a channel member for receiving said strip, a point at the leading edge of said channel member for piercing a hole in the meat, a pusher arm mounted for longitudinal displacement in said channel member, an actuating lever for displacing said pusher arm, ramp means disposed in said channel member near said pointed end, and linkage means pivotally interconnecting the rear end of said pusher arm to said actuating lever whereby, on operating said actuating lever in one direction, the forward end of said pusher arm rides up on said ramp means and ejects a leading end of said strip from said channel member into the hole in the meat and, on continued operation of said actuating lever in the same direction, said end of said pusher arm is lifted out of said channel member to an elevation above the forward end of the pusher arm to press the trailing end of said strip against said pierced hole.

* * * * *